US008074326B2

(12) United States Patent
Slank

(10) Patent No.: US 8,074,326 B2
(45) Date of Patent: Dec. 13, 2011

(54) STRAP ASSEMBLY WITH QUICK RELEASE ARRANGEMENT

(76) Inventor: Adam Slank, Austin, TX (US)

(*) Notice: Subject to any disclaimer, the term of this patent is extended or adjusted under 35 U.S.C. 154(b) by 455 days.

(21) Appl. No.: 12/319,802

(22) Filed: Jan. 12, 2009

(65) Prior Publication Data

US 2010/0175228 A1 Jul. 15, 2010

(51) Int. Cl.
- A44B 1/04 (2006.01)
- A44B 11/00 (2006.01)
- A44B 11/25 (2006.01)
- A44B 17/00 (2006.01)
- B68B 5/00 (2006.01)

(52) U.S. Cl. .... 24/165; 24/664; 24/573.11; 24/DIG. 51; 24/606; 119/776; 244/151 A; 244/151 B

(58) Field of Classification Search ............... 24/573.09, 24/578.15, 579.09, 164, 165, 182, 163 R, 24/172, 573.11, 298, 572.1, DIG. 51, 614, 24/615, 616, 606, 625, 647, 664, 665; 244/151 A, 244/151 B, 151 R; 119/770, 772, 774, 776
See application file for complete search history.

(56) References Cited

U.S. PATENT DOCUMENTS

| | | | |
|---|---|---|---|
| 577,315 A | 2/1897 | Nichols | |
| 794,563 A | 7/1905 | Stahlknecht | |
| 3,074,378 A * | 1/1963 | Clayton | 119/774 |
| 3,848,571 A | 11/1974 | Pearson | |
| 3,934,848 A | 1/1976 | Snyder | |
| 4,337,913 A * | 7/1982 | Booth | 244/151 B |
| 4,428,102 A | 1/1984 | Brownell | |
| 4,742,605 A | 5/1988 | Ritacco | |
| 4,903,638 A | 2/1990 | Lacey | |
| 4,923,150 A * | 5/1990 | Calkins et al. | 244/151 B |
| 5,005,527 A * | 4/1991 | Hatfield | 119/793 |
| 5,058,243 A | 10/1991 | Rasmussen | |
| 5,103,771 A | 4/1992 | Lee | |
| 5,197,410 A | 3/1993 | Wilson | |
| 5,205,021 A | 4/1993 | Durand | |
| RE34,351 E * | 8/1993 | Lacey | 119/776 |
| 5,426,829 A | 6/1995 | Hsiung | |
| 5,450,820 A | 9/1995 | Kirsch | |
| 5,784,763 A | 7/1998 | Cassidy | |
| 5,806,468 A | 9/1998 | Ryder | |
| 5,832,573 A * | 11/1998 | Howell | 24/664 |
| 6,056,242 A | 5/2000 | Collins | |
| 6,154,935 A * | 12/2000 | Gregory et al. | 24/614 |
| 6,164,048 A | 12/2000 | Rhodes | |
| 6,230,663 B1 | 5/2001 | Welch | |
| 6,382,139 B1 | 5/2002 | Rhodes | |

(Continued)

Primary Examiner — Thomas Will
Assistant Examiner — Abigail E Morrell
(74) Attorney, Agent, or Firm — David O. Simmons

(57) ABSTRACT

A strap assembly comprises an attachment member structure includes a main body and a plurality of attachment members. A first end portion of the main body is pivotable with respect to a second end portion thereof. Attachment members are connected to the main body at its opposing ends. A clasping device attached to the main body is engagable with one of the attachment members when a control portion of the clasping device is in a first position and selectively disengagable therefrom when a control portion of the clasping device is sufficiently displaced. A control structure is attached to the control portion of the clasping device such that sufficient displacement of the control structure with respect to the clasping device causes sufficient displacement of the control portion. A storage structure integral with the main body includes a passage configured for receiving at least a portion of the control structure therein.

20 Claims, 2 Drawing Sheets

U.S. PATENT DOCUMENTS

| | | | |
|---|---|---|---|
| 6,487,761 B2 * | 12/2002 | Van Tassel | 24/606 |
| 6,851,160 B2 | 2/2005 | Carver | |
| 6,883,640 B2 * | 4/2005 | Kurtgis | 182/3 |
| 6,983,913 B2 | 1/2006 | Auvray | |
| 6,988,694 B2 | 1/2006 | Barrs | |
| 7,155,786 B2 * | 1/2007 | Grimm | 24/647 |
| 7,162,978 B2 * | 1/2007 | Debien | 119/772 |
| 7,448,116 B1 * | 11/2008 | Howell | 24/614 |
| 7,640,639 B2 * | 1/2010 | de Bien | 24/615 |
| 7,828,180 B2 * | 11/2010 | Slesar | 224/257 |

\* cited by examiner

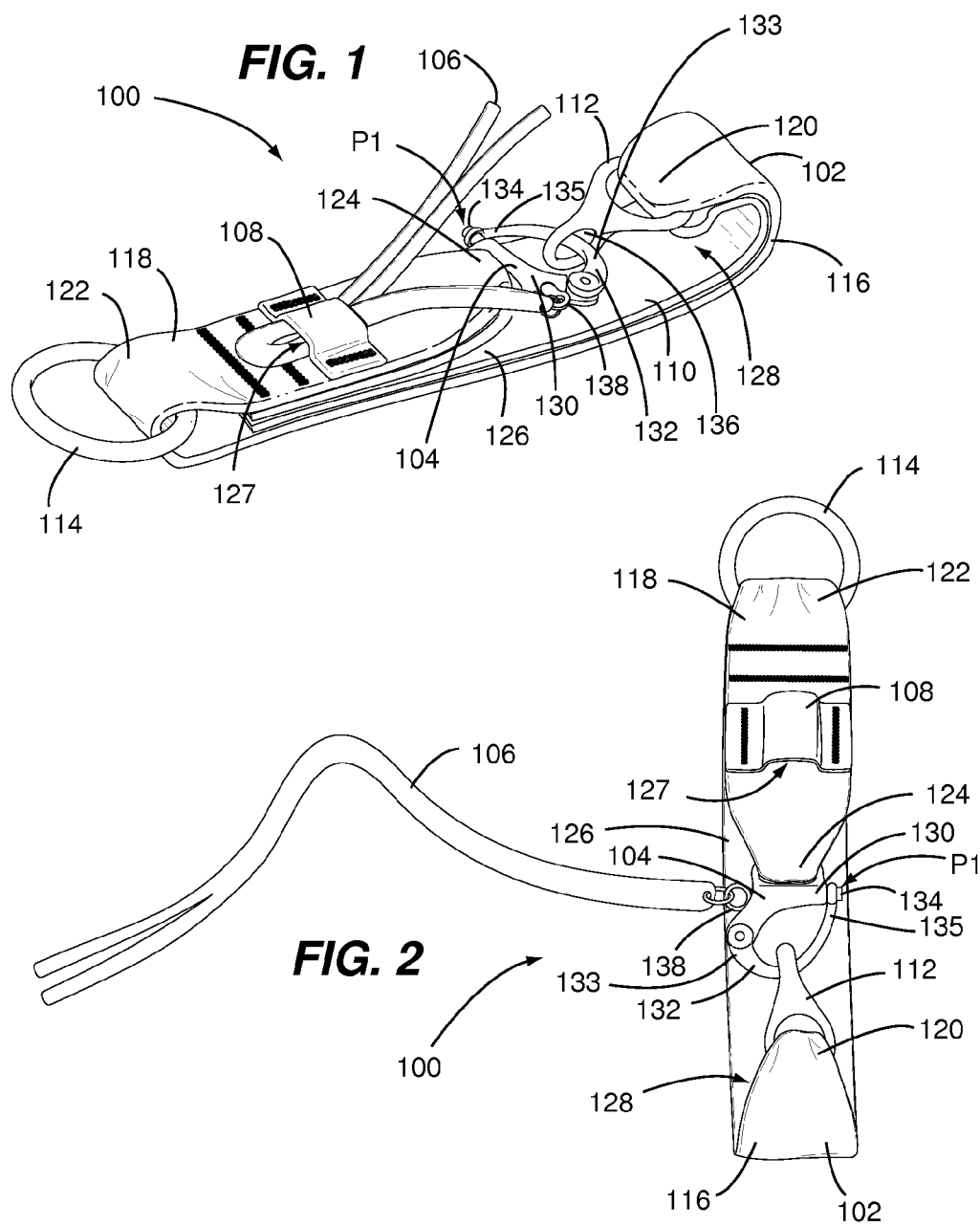

STRAP ASSEMBLY WITH QUICK RELEASE ARRANGEMENT

CROSS REFERENCE TO RELATED APPLICATIONS

This patent application claims priority from co-pending U.S. Provisional Patent Application having Ser. No. 61/006,851 filed Feb. 4. 2008 entitled "Quick Release Loop Connection", having a common applicant herewith and being incorporated herein in its entirety by reference.

FIELD OF THE DISCLOSURE

The disclosures made herein relate generally to strap assemblies and, more particularly, To strap assemblies with integral quick-release arrangement.

BACKGROUND

Various types of strap assemblies and their uses are well known. Such strap assemblies are commonly used to secure one item to another item, apply loads between items, and the like. Examples of uses for such strap assemblies include, but are not limited to, straps used for animal restraint, straps used for parachute deployment, straps used for general binding or articles, and the like.

As can be appreciated from the various uses for strap assemblies, in many cases, it is desirable for a strap assembly to be configured in a manner allowing connected items to be quickly and selectively released or detached from each other. In such cases, the strap assembly includes a quick-release arrangement (e.g., integral clasping device) that allows such connected items to be quickly and selectively released or detached from each other. Therefore, it is apparent that strap assemblies with an integral quick-release arrangement are advantageous, desirable and useful.

SUMMARY OF THE DISCLOSURE

In one embodiment of the present invention, a strap assembly comprises an attachment member structure, a clasping device and a control structure. The attachment member structure includes a main body and a plurality of attachment members. A first end portion of the main body is pivotable with respect to a second end portion thereof. A first one of the attachment members is connected to the main body at the first end portion and a second one of the attachment members is connected to the main body at the second end portion. The clasping device is attached to the main body at a central portion thereof between the end portions. The clasping device is configured for being engaged with the first one of the attachment members when a control portion of the clasping device is in a first position and for being selectively disengaged therefrom when a control portion of the clasping device is sufficiently displaced from the first position toward a second position. The control structure is attached to the control portion of the clasping device such that sufficient displacement of the control structure with respect to the clasping device causes sufficient displacement of the control portion thereby disengaging the clasping device from the first one of the attachment members.

In another embodiment of the present invention, a strap assembly comprises a strap structure, a first attachment member, a second attachment member, a clasping device, a control structure and a storage structure. The strap structure has a first end portion, a second end portion and a central portion therebetween. The first attachment member is attached to the strap structure at the first end portion thereof and the second attachment member is attached to the strap structure at the second end portion thereof. The clasping device is attached to the strap structure at the central portion of the strap structure. The clasping device is configured for being engaged with the first one of the attachment members when a control portion of the clasping device is in a first position and for being selectively disengaged therefrom when a control portion of the clasping device is sufficiently displaced from the first position toward a second position. The control structure is attached to the control portion of the clasping device such that sufficient displacement of the control structure with respect to the clasping device causes sufficient displacement of the control portion thereby disengaging the clasping device from the first attachment member. The storage structure is integral with the strap structure at a location between the second end and central portions thereof. The storage structure includes a control structure receiving passage having an open end facing the central portion of the strap structure.

In another embodiment of the present invention, a strap assembly comprises a length of conformable strap material strap structure, a first attachment ring structure, a second attachment ring structure, a clasping device, a control cord and a storage structure. The length of conformable strap material is folded in a manner forming a plurality of spaced apart loop structures therein. The first attachment ring structure engaged by a first one of the loop structures and the second attachment ring structure engaged by a second one of the loop structures. The clasping device includes a clasping device body and a ring structure engaging portion pivotably attached at a first end portion thereof to the clasping device body. The clasping device body is engaged by a third one of the loop structures located between the first and second loop structures. The clasping device body has a retention member movably mounted thereon. The retention member is spring-biased to a first position and is selectively displaceable to a second position. A second end portion of the ring structure engaging portion is engagable by the retention member when the retention member is in the first position such that the ring structure engaging portion can be fixedly secured within an aperture of the first attachment ring structure. Sufficient displacement of the retention member from the first position toward the second position causes the second end portion of the ring structure engaging portion to become disengaged from the retention member when the second end portion of the ring structure engaging portion is engaged by the retention member. The control cord is attached to the retention member in a manner whereby sufficient displacement of the control cord with respect to the clasping device body causes the retention member to move from the first position toward the second position. The storage structure is attached to the strap material at a location between the second attachment member and the clasping device. The storage structure includes a control cord receiving passage having an open end facing the central portion of the first attachment ring structure.

These and other objects, embodiments, advantages and/or distinctions of the present invention will become readily apparent upon further review of the following specification, associated drawings and appended claims.

BRIEF DESCRIPTION OF THE DRAWINGS

FIG. 1 is a perspective view showing a strap assembly in accordance with an embodiment of the present invention.

FIG. 2 is a top plan view of the strap assembly shown in FIG. 1, wherein the strap assembly is in an article-engaging configuration.

DETAILED DESCRIPTION OF THE DRAWING FIGURES

Figure 3:
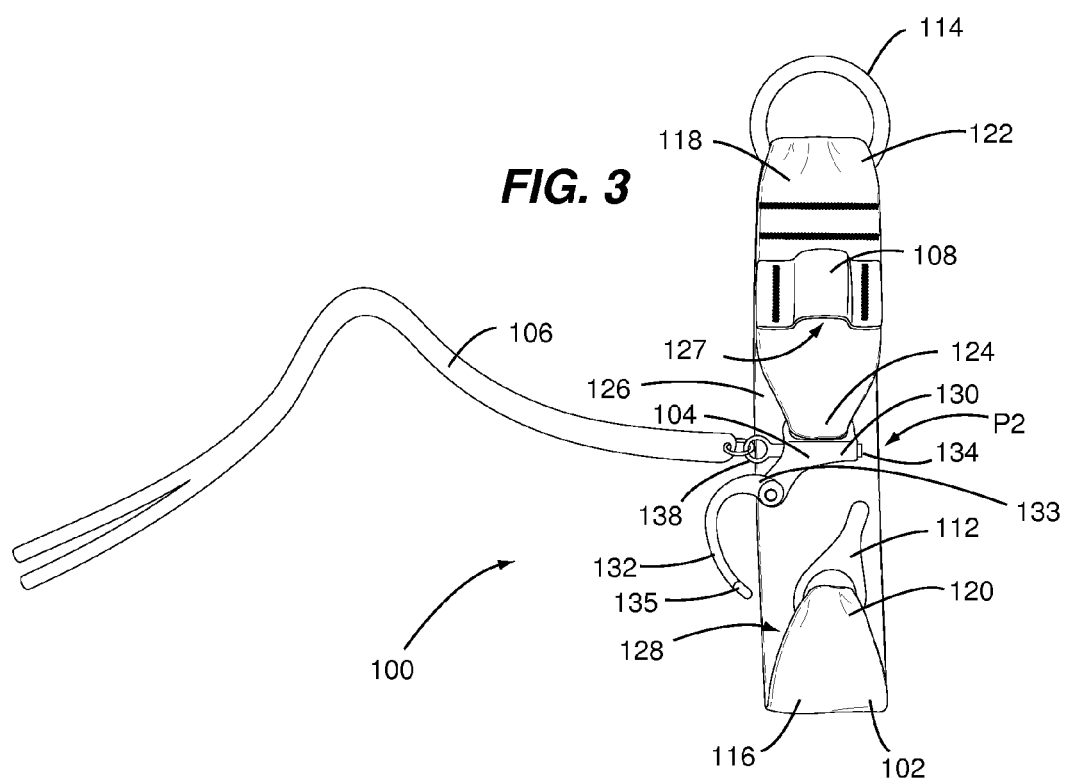
FIG. 3 is a top plan view of the strap assembly shown in FIG. 1, wherein the strap assembly is in an article-releasing configuration.

Referring to FIGS. 1-3, a strap assembly 100 configured in accordance with an embodiment of the present invention is shown. As will be understood from the ensuing disclosure, a strap assembly in accordance with the present invention (e.g., strap assembly 100) is configured in a manner allowing an item connected to the strap assembly to be quickly and selectively released (i.e., detached) therefrom. To this end, such a strap assembly includes a quick-release arrangement that allows an item connected thereto to be quickly and selectively released from the strap assembly.

The strap assembly 100 includes an attachment member structure 102, a clasping device 104, a control structure 106 and a storage structure 108. The attachment member structure 102 includes a main body 110 and a plurality of attachment members 112, 114. A first attachment member 112 is connected to the main body 110 at its first end portion 116 and a second attachment member 114 is connected to the main body 110 at its second end portion 118. As shown, the first attachment member 112 is a dual aperture attachment member in the form of a perpendicular offset aperture steel ring structure and the second attachment member 114 is a single aperture attachment member in the form of a steel ring. It is disclosed herein that embodiments of the present invention are not unnecessarily limited to a particular configuration of attachment member.

The main body 110 (i.e., a strap structure) of the attachment member structure 102 is formed from a length of conformable strap material folded in a manner forming a plurality of spaced apart loop structures 120, 122, 124. Sewn stitching, rivets, heat staking, laser welding, adhesive and the like are examples of means for retaining the length of conformable strap material in a desired configuration (i.e., multi-loop configuration). The first attachment member 112 is connected to a first loop structure 120. The second attachment member 114 is connected to a second loop structure 122. The clasping device 104 is connected to a third loop structure 124. The clasping device 104 is attached to the main body 110 of the attachment member structure 102 at its central portion 126 (i.e., between the first and second end portions 116, 118). The clasping device 104 is attached to the main body 110 of the attachment member structure 102 at its central portion 126 (i.e., between the first and second end portions 116, 118). It is disclosed herein that the discrete attachment members 112, 114 can be omitted with the loop structures 120, 122 serving as the first and second loop structures discussed above.

The first end portion 116 of the main body 110 is capable of being articulated (e.g., pivotable) with respect to the second end portion 118. In one embodiment, forming the main body 110 from conformable strap material provides for such articulation through inherent conformability of the conformable strap material. In other embodiments, the main body 110 can be made from a substantially non-flexible material with such flexibility being provided by a mechanical pivot structure (e.g., a hinge), a polymeric hinge structure (e.g., a co-molded elastomer) or the like. A skilled person will appreciate and contemplate various different means of making a strap structure (e.g., the main body 110) in a manner whereby its first end portion is capable of being articulated with respect to its second end portion.

The clasping device 104 is configured for being engaged with the first attachment member 112 and for being selectively disengaged therefrom. The control structure 106 is connected to the clasping device 104 in a manner whereby exertion of force on the control structure causes the first attachment member 112 to become disengaged from the clasping device 104. Such engagement and selective disengagement allows an item connected to the strap assembly 100 (i.e., extending through a space 128 formed between the main body 110, the first attachment member 112 and the clasp device 104) to be quickly and selectively released (i.e., detached) from the strap assembly 100.

The storage structure 108 is attached to the main body 110 (i.e., conformable strap material) of the strap assembly 102 at a location between its second end portion 118 and the clasping device 104. The storage structure 108 serves the purpose of providing a convenient and functional location for stowing the control structure 106. In one embodiment, the control structure 106 is made from a length of conformable cord material and the storage structure 108 includes a discrete piece of material (e.g., conformable strap material) attached to the main body 110 for forming a passage 127 configured for having a portion of the control structure 106 stowed therein. To enhance operability and rapid release functionality of the strap assembly 100, it is advantageous and desirable for the passage 127 to have an open end facing the central portion of the main body 110 such that pulling of the control structure 106 causes its extraction from within the storage structure 108 in combination with actuating release functionality of the clasping device 104 (See FIGS. 2 and 3). It is disclosed herein that the control structure 106 and the storage structure 108 can be configured/constructed in alternative manners, alternative materials and the like. For example, the control structure 106 can be a molded polymeric article and the storage structure 108 can be unitarily integrated with the main body 110 (e.g., a unitarily formed pouch).

Still referring to FIGS. 1-3, the clasping device 104 includes a clasping device body 130 and an attachment member engaging portion 132 pivotably attached at its first end portion 133 to the clasping device body 130. In embodiments where the attachment members are fashioned as rings, the attachment member engaging portion 132 can also be referred to as a ring structure engaging portion. The clasping device body 130 is engaged by (i.e., connected to) the third loop structure 124 of the main body 110.

A retention member 134 is slideably mounted on the clasping device body 130. The retention member 134 slides axially along a centerline axis of the retention member 134. A pivot axis of the attachment member engaging portion 132 extends substantially perpendicular to the retention member centerline axis. The retention member 134 is spring-biased to a first position P1 (See FIGS. 1 and 2) and is selectively displaceable to a second position P2 (See FIG. 3). A second end portion 135 of the attachment member engaging portion 134 is engagable by the retention member 134 when the retention member 134 is in the first position P1 such that the attachment member engaging portion 134 can be fixedly secured within an aperture 136 (FIG. 1) of the first attachment member 112.

Sufficient displacement of the retention member 134 from the first position P1 toward the second position P2 causes the second end portion 135 of the attachment member engaging portion 132 to become disengaged from the retention member 134. The control structure 106 is attached to a control portion 138 of the retention member 134 in a manner whereby sufficient displacement of the control structure 106 with respect to the clasping device body 130 causes the retention member 134 to move from the first position P1 toward the second position P2. Accordingly, through such displacement, the retention member 134 becomes disengaged from the attachment member engaging portion 132 of the clasping device 104.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A strap assembly, comprising:
an attachment member structure including a main body and a plurality of attachment members, wherein a first end portion of the main body is pivotable with respect to a second end portion thereof, wherein a first one of said attachment members is connected to the main body at the first end portion and wherein a second one of said attachment members is connected to the main body at the second end portion;
a clasping device attached to the main body at a central portion thereof between said end portions, wherein the clasping device is configured for being engaged with the first one of said attachment members when a control portion of the clasping device is in a first position and for being selectively disengaged therefrom when the control portion of the clasping device is sufficiently displaced from the first position toward a second position; and
a control structure attached to the control portion of the clasping device such that sufficient displacement of the control structure with respect to the clasping device causes sufficient displacement of the control portion thereby disengaging the clasping device from the first one of said attachment members, wherein the control structure is attached to the control portion of the clasping device such that control structure remains attached to the control portion of the clasping device after the clasping device becomes disengaged from the first one of said attachment members.

2. The strap assembly of claim 1, further comprising:
a storage structure integral with the main body at a location between said second end and central portions thereof, wherein the storage structure includes a passage configured for receiving at least a portion of the control structure therein, wherein the control portion of the clasping device is engaged with the control structure at a first side of the strap structure, and wherein the passage of the storage structure resides on the first side of the strap structure.

3. The strap assembly of claim 1 wherein:
the main body of the attachment member structure is formed from a length of conformable strap material folded in a manner forming a plurality of spaced apart loop structures therein;
the first one of said attachment members is connected to a first one of said loop structures;
the second one of said attachment members is connected to a second one of said loop structures;
the clasping device is connected to a third one of said loop structures; and
the storage structure includes a discrete piece of material attached to the main body for forming the passage thereof.

4. The strap assembly of claim 3 wherein:
the clasping device includes a clasping device body and an attachment member engaging portion pivotably attached at a first end portion thereof to the clasping device body;
the clasping device body is connected to the main body;
the clasping device body has a retention member movably mounted thereon;
the control portion is integral with the retention member;
the retention member is spring-biased to the first position and is selectively slideable to the second position;
a second end portion of the attachment member engaging portion is engagable by the retention member when the retention member is in the first position such that the attachment member engaging portion can be fixedly engaged with the first one of said attachment members; and
sufficient displacement of the retention member from the first position toward the second position causes the second end portion of the attachment member engaging portion to become disengaged from the retention member when the second end portion of the attachment member engaging portion is engaged by the retention member.

5. The strap assembly of claim 4 wherein:
each one of said attachment members includes an attachment ring structure;
each attachment ring structure includes an aperture therein; and
the attachment member engaging portion extends through the aperture when the attachment member engaging portion is fixedly engaged with the first one of said attachment members.

6. The strap assembly of claim 5 wherein:
the retention member is slideably mounted on the clasping device body;
the retention member slides axially along a centerline axis of the retention member; and
a pivot axis of the attachment member engaging portion extends substantially perpendicular to said retention member centerline axis.

7. The strap assembly of claim 6, further comprising:
a storage structure integral with the strap structure at a location between said second end and central portions thereof, wherein the storage structure includes a passage configured for receiving at least a portion of the control structure therein wherein the control portion of the clasping device is engaged with the control structure at a first side of the strap structure, and wherein the passage of the storage structure resides on the first side of the strap structure.

8. The strap assembly of claim 7 wherein:
the control structure includes a length of cord material and
the passage has an open end facing the central portion of the body.

9. The strap assembly of claim 1 wherein:
each one of said attachment members includes an attachment ring structure;
each attachment ring structure includes an aperture therein;
the clasping device includes a clasping device body and an attachment member engaging portion pivotably attached at a first end portion thereof to the clasping device body;
the clasping device body is connected to the main body;
the clasping device body has a retention member movably mounted thereon;
the control portion is integral with the retention member;
the retention member is spring-biased to the first position and is selectively slideable to the second position;
a second end portion of the attachment member engaging portion is engagable by the retention member when the retention member is in the first position such that the attachment member engaging portion can be fixedly engaged with the first one of said attachment members;
the attachment member engaging portion extends through the aperture of the first one of said attachment members when the attachment member engaging portion is fixedly engaged with the first one of said attachment members; and
sufficient displacement of the retention member from the first position toward the second position causes the second end portion of the attachment member engaging portion to become disengaged from the retention member when the second end portion of the attachment member engaging portion is engaged by the retention member.

10. The strap assembly of claim 9 wherein:
the main body of the attachment member structure is formed from a length of conformable strap material folded in a manner forming a plurality of spaced apart loop structures therein;
the first one of said attachment members is connected to a first one of said loop structures;
the second one of said attachment members is connected to a second one of said loop structures;
the clasping device is connected to a third one of said loop structures; and
the storage structure includes a discrete piece of material attached to the mainbody for forming a passage thereof.

11. A strap assembly, comprising:
a strap structure having a first end portion, a second end portion and a central portion therebetween;
a first attachment member attached to the strap structure at the first end portion thereof;
a second attachment member attached to the strap structure at the second end portion thereof;
a clasping device attached to the strap structure at the central portion thereof, wherein the clasping device is configured for being engaged with the first one of said attachment members when a control portion of the clasping device is in a first position and for being selectively disengaged therefrom when a control portion of the clasping device is sufficiently displaced from the first position toward a second position;
a control structure attached to the control portion of the clasping device such that sufficient displacement of the control structure with respect to the clasping device causes sufficient displacement of the control portion thereby disengaging the clasping device from the first attachment member, wherein the control structure is engaged with the control portion of the clasping device at a first side of the strap structure; and
a storage structure integral with the strap structure at a location between said second end and central portions thereof, wherein the storage structure includes a control structure receiving passage having an open end facing the central portion of the strap structure, wherein the control structure receiving passage of the storage structure resides on the first side of the strap structure.

12. The strap assembly of claim 11 wherein:
the strap structure is formed from a length of conformable strap material folded in a manner forming a plurality of spaced apart loop structures therein;
the first attachment member is connected to a first one of said loop structures;
the second attachment member is connected to a second one of said Loop structures; and
the clasping device is connected to a third one of said loop structures.

13. The strap assembly of claim 12 wherein the storage structure includes a discrete piece of conformable strap material attached to the main body for forming the control structure receiving passage.

14. The strap assembly of claim 11 wherein:
the clasping device includes a clasping device body and an attachment member engaging portion pivotably attached at a first end portion thereof to the clasping device body;
the clasping device body is connected to the main body;
the clasping device body has a retention member movably mounted thereon;
the control portion is integral with the retention member;
the retention member is spring-biased to the first position and is selectively slideable to the second position;
a second end portion of the attachment member engaging portion is engagable by the retention member when the retention member is in the first position such that the attachment member engaging portion can be fixedly secured within an aperture of the first attachment member; and
sufficient displacement of the retention member from the first position toward the second position causes the second end portion of the ring structure engaging portion to become disengaged from the retention member when the second end portion of the ring structure engaging portion is engaged by the retention member.

15. The strap assembly of claim 14 wherein:
the retention member is slideably mounted on the clasping device body;
the retention member slides axially along a centerline axis of the retention member; and
a pivot axis of the ring structure engaging portion extends substantially perpendicular to said retention member centerline axis.

16. The strap assembly of claim 15 wherein:
the control structure includes a length of cord material and
the passage has an open end facing the central portion of the body.

17. The strap assembly of claim 16 wherein each one of said attachment members includes an attachment structure.

18. A strap assembly, comprising:
a length of conformable strap material folded in a manner forming a plurality of spaced apart loop structures therein;
a first attachment ring structure engaged by a first one of said loop structures;
a second attachment ring structure engaged by a second one of said loop structures;
a clasping device includes a clasping device body and a ring structure engaging portion pivotably attached at a first end portion thereof to the clasping device body, wherein the clasping device body is engaged by a third one of said loop structures located between said first and second loop structures, wherein the clasping device body has a retention member movably mounted thereon, wherein the retention member is spring-biased to a first position and is selectively displaceable to a second position, wherein a second end portion of the ring structure engaging portion is engagable by the retention member when the retention member is in the first position such that the ring structure engaging portion can be fixedly secured within an aperture of the first attachment ring structure, and wherein sufficient displacement of the retention member from the first position toward the second position causes the second end portion of the ring structure engaging portion to become disengaged from the retention member when the second end portion of the ring structure engaging portion is engaged by the retention member;
a control cord attached to the retention member in a manner whereby sufficient displacement of the control cord with respect to the clasping device body causes the retention member to move from the first position toward the second position, wherein the control cord is attached to the retention member of the clasping device such that control cord remains attached to the retention member of the clasping device after second end portion of the ring structure engaging portion becomes disengaged from the retention member; and
a storage structure attached to said strap material at a location between the second attachment member and the clasping device, wherein the storage structure includes a control cord receiving passage having an open end facing the central portion of the first attachment ring structure.

19. The strap assembly of claim 18 wherein the storage structure includes a discrete piece of conformable strap material attached to the main body for forming the control cord receiving passage.

20. The strap assembly of claim 18 wherein:
the retention member is slideably mounted on the clasping device body;
the retention member slides axially along a centerline axis of the retention member; and
a pivot axis of the ring structure engaging portion is substantially perpendicular to said retention member centerline axis.

* * * * *